US006544637B1

United States Patent
Kosuge (10) Patent No.: US 6,544,637 B1
(45) Date of Patent: Apr. 8, 2003

(54) POROUS INORGANIC MATERIAL HAVING PORE WALLS OF CRYSTALLINE TITANIUM OXIDE AND METHOD OF PRODUCING SAME

(75) Inventor: Katsunori Kosuge, Tsukuba (JP)

(73) Assignee: Secretary of Agency of Industrial Science and Technology (JP)

( * ) Notice: Subject to any disclaimer, the term of this patent is extended or adjusted under 35 U.S.C. 154(b) by 0 days.

(21) Appl. No.: 09/711,132

(22) Filed: Nov. 14, 2000

(30) Foreign Application Priority Data

Nov. 16, 1999 (JP) .......................... 11-325722

(51) Int. Cl.[7] .............. B32B 3/00; B32B 3/26
(52) U.S. Cl. ................ 428/312.2; 428/307.3; 428/312.6; 428/312.8; 428/319.3; 428/319.9; 428/502; 428/350
(58) Field of Search .............. 428/307.3, 312.6, 428/312.8, 319.3, 319.9; 423/701, 702, 703, 704, 705, 710, 713, 715, 610; 502/350; 501/134, 154

(56) References Cited

U.S. PATENT DOCUMENTS

| 3,431,297 | A | * | 3/1969 | Brockhaus | ............... 562/547 |
|---|---|---|---|---|---|
| 3,917,682 | A | * | 11/1975 | Mizukami et al. | .......... 502/350 |
| 3,948,807 | A | * | 4/1976 | Fuchigami et al. | ......... 502/242 |
| 4,176,089 | A | * | 11/1979 | Cull | ........................... 502/236 |
| 4,515,900 | A | * | 5/1985 | Hettinger, Jr. et al. | |
| 4,869,805 | A | * | 9/1989 | Lok et al. | |
| 5,057,296 | A | * | 10/1991 | Beck | |
| 5,098,684 | A | * | 3/1992 | Kresge et al. | |
| 5,308,602 | A | * | 5/1994 | Calabro et al. | |
| 5,688,975 | A | * | 11/1997 | Nair et al. | |
| 5,718,878 | A | * | 2/1998 | Zhang | |
| 5,837,639 | A | * | 11/1998 | Kresge et al. | |
| 5,855,864 | A | * | 1/1999 | Pinnavaia et al. | |
| 5,958,367 | A | * | 9/1999 | Ying et al. | |
| 5,958,369 | A | * | 9/1999 | Kosuge et al. | |
| 6,087,514 | A | * | 7/2000 | Thangaraj et al. | |
| 6,099,819 | A | * | 8/2000 | Srinivas et al. | |

* cited by examiner

Primary Examiner—Terrel Morris
Assistant Examiner—Leanna Roché
(74) Attorney, Agent, or Firm—Lorusso & Loud (57) ABSTRACT

An inorganic porous material, having uniform pores defined by pore walls of crystalline titanium oxide. The inorganic porous material may be produced by heating an organic inorganic mesostructured material containing titanium and having a hexagonal crystal phase at a temperature and for a period of time sufficient to form a porous material having a multiplicity of pores defined by pore walls containing crystalline titanium oxide.

5 Claims, 6 Drawing Sheets

POROUS INORGANIC MATERIAL HAVING PORE WALLS OF CRYSTALLINE TITANIUM OXIDE AND METHOD OF PRODUCING SAME

BACKGROUND OF THE INVENTION

This invention relates to a porous inorganic material having pore walls of crystalline titanium oxide and to a method of producing same.

While crystalline titanium oxide has been hitherto used as a white pigment, much attention has been paid in recent years thereon because of the function thereof as a photocatalyst, in particular as a hydrolysis catalyst, a wet solar cell or a catalyst for decomposing pollutants.

Pores of known crystalline titanium oxide are formed between primary particles thereof, but are not present within the primary particle itself. As a consequence, the pores are not uniform and the catalytic efficiency is not high. Thus, when the known crystalline titanium oxide catalyst is used for decomposing $NO_x$, for example, it is necessary to support the catalyst on a porous carrier, to form into a membrane using a binder or to mix same with another porous material in order to increase a contact area with the reactants or to improve the adsorbing characteristics thereof.

SUMMARY OF THE INVENTION

The present invention provides an inorganic material having a multiplicity of pores which have a uniform pore diameter and which are defined by pore walls containing crystalline titanium oxide such as anatase or rutile.

The inorganic material can exhibit excellent shape selectivity and efficiently trap molecules or ions in the pores and, hence, is useful for many applications such as an oxidation catalyst and a photocatalyst.

The present invention also provides a method for preparing an inorganic porous material, wherein an organic inorganic mesostructured material containing titanium and having a hexagonal crystal phase is subjected to a heat treatment at a temperature and for a period of time sufficient to form a multiplicity of pores which have a uniform pore diameter and which are defined by pore walls containing crystalline titanium oxide.

In the present specification, the term "uniform pore diameter" is intended to refer to such a pore characteristic that a well defined peak is present in a pore distribution pattern obtained according to the MP method (Mikhail, R. S. H.; Brunauer, S.; Bodor, E. E., J. Colloid Interface Sci. Vol. 26, 45–53, 1968) or the BJH method (Barrett, E. P.; Joyner, L. G.; Halenda, P. P., J. Am. Chem. Soc., Vol. 73, 373–380, 1951) which is used in association with a nitrogen absorption isotherm. The term "pore diameter" used in the present specification is intended to refer to the diameter at which the peak is present in the above pore distribution pattern.

In the present specification, the term "organic inorganic mesostructured material containing titanium and having a hexagonal crystal phase" is intended to refer to a precursor material showing an X-ray diffraction pattern which is obtained using Cu as a target and in which at least two peaks are present in 2θ (CuKα) of 10° or less.

It is an object of the present invention to provide a porous inorganic material having a multiplicity of pores defined by crystalline titanium oxide.

Another object of the present invention is to provide a porous inorganic material of the above-mentioned type which has uniform pore diameter and which is useful for various applications.

It is yet a further object of the present invention to provide a method which can produce the above inorganic material.

BRIEF DESCRIPTION OF THE DRAWINGS

Other objects, features and advantages of the present invention will become apparent from the detailed description of the preferred embodiments of the invention which follows, when considered in the light of the accompanying drawings, in which.

DETAILED DESCRIPTION OF THE PREFERRED EMBODIMENTS OF THE INVENTION

A porous material according to a first embodiment of the present invention may be obtained as follows.

An aqueous solution or an acidic solution of a titanium compound such as titanium oxysulfate (e.g. $TiOSO_4.xH_2SO_4.xH_2O$ or $TiOSO_4.nH_2O$) is mixed with an aqueous solution or an acidic solution of a surfactant, preferably a cationic surfactant.

The cationic surfactant (SA) may be, for example, bromine-type or chlorine type surfactant having 14–22 carbon atoms, preferably 16–18 carbon atoms, such as dodecyltrimethylammonium, tetradecyltrimethylammonium, hexadecyltrimethylammonium and octadecyltrimethylammonium. The use of hexadecyltrimethylammonium (CTABr) is particularly preferably used. The acid may be an inorganic acid such as hydrochloric acid, sulfuric acid or nitric acid. The molar ratio of the reactants Ti:SA:$H_2O$:acid is preferably 1:(0.8–2.5):(500–2000):(0–7), more preferably 1:(1–2):(750–1600):(0–4).

The mixture is then reacted to form a suspension. The reaction may be carried out at 15–45° C., preferably 20–40° C. The reaction time is generally 1–30 hours, preferably 1–20 hours.

The solid matters in the suspension are then separated, dried at 20–100° C., preferably 40–70° C., for 24 hours or more to obtain an organic inorganic mesostructured material having a hexagonal crystal phase in which Ti-containing ions and cationic surfactant molecules are regularly arranged.

The mesostructured material is then heat-treated at a temperature of at least 300° C., preferably 400–800° C., to remove the organic component (surfactant) to give the porous material which is generally in the form of powder. The porous material generally has a pore diameter of 0.8–8 nm, preferably 1–6 nm, a pore volume of at least 0.02 ml/g, preferably 0.04–0.14 ml/g, and a specific surface area of at least 10 $m^2$/g, preferably 20–220 $m^2$/g. The pore diameter, pore volume, specific surface area and thickness of pore walls of the porous material can be controlled by selection of the kind of the surfactant and temperature of the heat treatment.

One preferred method of preparing a porous material whose pores are defined by pore walls of crystalline titanium oxide is as follows. Titanium oxysulfate is added to aqueous hydrochloric acid and dissolved therein with stirring to obtain a first, homogeneous solution. CTABr (hexadecyltrimethylammonium bromide) is dissolved in aqueous hydrochloric acid to obtain a second, homogeneous solution. With stirring, the second solution is added to the first solution. The mixture is reacted at 20–40° C. for 1–12 hours. The molar ratio of the reactants in the mixture Ti:CTABr:$H_2O$:HCl is 1:(1–2):(750–1600):(0–4). After the completion of the reaction, solids are separated from the reaction mixture (suspension) and dried at 40–70° C. for 24 hours or more to obtain a mesostructured material. This is heat treated at 400–700° C. to remove the organic matters, thereby obtaining the porous material.

In a second embodiment of the porous material according to the present invention, the pore walls contain silica in addition to crystalline titanium oxide. Such a porous material may be prepared by incorporating a silicon compound, preferably a silicon alkoxide, to a reaction mixture used in the above first embodiment.

The silicon alkoxide may be, for example, tetraethylorthosilicate (TEOS) or tetrabutylorthosilicate. Tetraethylorthosilicate is preferably used.

The molar ratio of the reactants Ti:SA:$H_2O$:acid:Si is preferably 1:(0.8–2.5):(500–2000):(0–7):(0.005–2.0), more preferably 1:(1–2):(750–1600):(0–4):(0.05–1.5). Thus, the molar ratio of silicon to titanium is preferably 0.005–2.0, more preferably 0.05–1.5. When the proportion of silicon exceeds 2.0, physical and chemical properties of crystalline titanium oxide are blocked or hindered. Too small a content of silicon below 0.005 fails to give an effect of the addition of silicon.

The porous material generally has a pore diameter of 0.6–8 nm, preferably 0.9–7 nm, a pore volume of at least 0.05 ml/g, preferably 0.06–0.26 ml/g, and a specific surface area of at least 20 $m^2$/g, preferably 40–500 $m^2$/g. The pore diameter, pore volume, specific surface area and thickness of pore walls of the porous material can be controlled by selection of the kind of the surfactant and temperature of the heat treatment. Because of the presence of silica, the titanium oxide crystal phase has improved thermal stability. Thus, the uniform pore diameter can be retained even when the heat treatment is carried out at a higher temperature.

One preferred method of preparing a porous material whose pores are defined by pore walls of crystalline titanium oxide and silica is as follows. Titanium oxysulfate is added to aqueous hydrochloric acid and dissolved therein with stirring to obtain a first, homogeneous solution. TEOS (tetraethylorthosilicate) is added to the first solution and the mixture is stirred for 10–30 minutes. CTABr (hexadecyltrimethylammonium bromide) is dissolved in aqueous hydrochloric acid to obtain a second, homogeneous solution. With stirring, the second solution is added to the first solution to which TEOS has been added. The mixture is reacted at 20–40° C. for 1–12 hours. The molar ratio of the reactants in the mixture Ti:CTABr:$H_2O$:HCl:Si is 1: (1–2):(750–1600):(0–4):(0.0001–2). After the completion of the reaction, solids are separated from the reaction mixture (suspension) and dried at 40–70° C. for 24 hours or more to obtain a mesostructured material. This is heat treated at 400–900° C. to remove the organic matters, thereby obtaining the porous material.

In a third embodiment of the porous material according to the present invention, the pore walls contain a transition metal which is substituted for a part of silicon of the silica and/or for a part of the titanium of crystalline titanium oxide of the pore walls of the porous material according to the second embodiment. Such a porous material may be prepared by adding a compound of a transition metal to the reaction mixture used in the above-described method.

Any transition metal compound may be used as long as it is soluble in a solution containing a titanium compound and a silicon compound. An inorganic acid salt, such as sulfate, nitrate or sulfate, of the transition metal may be suitably used. Illustrative of the transition metals M are Cu, Fe, Cr, Co, Ni and V.

The molar ratio of the reactants Ti:SA:$H_2O$:acid:Si:M is preferably 1:(0.8–2.5):(500–2000):(0–7):(0–3.5):(0.0001–1.5), more preferably 1:(1–2):(750–1600):(0–4):(0.0001–2.0):(0.001–0.85).

The porous material generally has a pore diameter of 0.6–8 nm, preferably 0.9–7 nm, a pore volume of at least 0.05 ml/g, preferably 0.06–0.25 ml/g, and a specific surface area of at least 20 $m^2$/g, preferably 40–500 $m^2$/g. The pore diameter, pore volume, specific surface area and thickness of pore walls of the porous material can be controlled by selection of the kind of the surfactant and temperature of the heat treatment. Because of the presence of silica and the transition metal, the titanium oxide crystal phase has improved thermal stability and good characteristics in absorbing visible light.

One preferred method of preparing a porous material whose pores are defined by pore walls of crystalline titanium oxide, silica and a transition metal is as follows. Titanium oxysulfate is added to aqueous hydrochloric acid and dissolved therein with stirring to obtain a first, homogeneous solution. A transition metal salt is dissolved in the first solution and, subsequently, TEOS (tetraethylorthosilicate) is added. The mixture is stirred for 10–30 minutes. CTABr (hexadecyltrimethylammonium bromide) is dissolved in aqueous hydrochloric acid to obtain a second, homogeneous solution. With stirring, the second solution is added to the first solution to which the transition metal salt and TEOS have been added. The mixture is reacted at 20–40° C. for 1–12 hours. The molar ratio of the reactants in the mixture Ti:CTABr:$H_2$O:HCl:Si:M is 1:(1–2):(750–1600):(0–4): (0.0001–2):(0.001–0.85). After the completion of the reation, solids are separated from the reaction mixture (suspension) and dried at 40–70° C. for 24 hours or more to obtain a mesostructured material. This is heat treated at 400–900° C. to remove the organic matters, thereby obtaining the porous material.

The crystal structures of the above porous materials of the first to third embodiments (obtained in the hereinafter described Examples) will now be described in detail with reference to the accompanying drawings.

Figure 1:
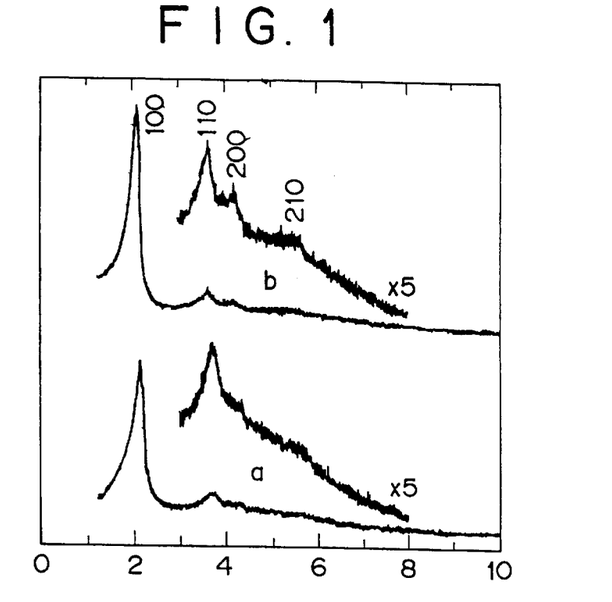
FIG. 1 is powder X-ray diffraction patterns of organic inorganic-mesostructured materials obtained in Example 1 (pattern a) and in Example 2 (pattern b)

FIG. 1 is powder X-ray diffraction patterns of an organic inorganic mesostructured material which is obtained in Example 1 and which is a precursor for a porous material of the first embodiment (pattern a) and a mesostructured material (Ti:Si=1:1.18) which is obtained in Example 2 and which is a precursor for a porous material of the second embodiment (pattern b). Miller indices are given for the peaks of the pattern b. The precursor of the pattern b has thus a hexagonal superstructure similar to MCM-41. Comparison of the pattern a with the pattern b indicates that the precursor for the porous material of the first embodiment also has a hexagonal crystal phase.

Figure 2A:
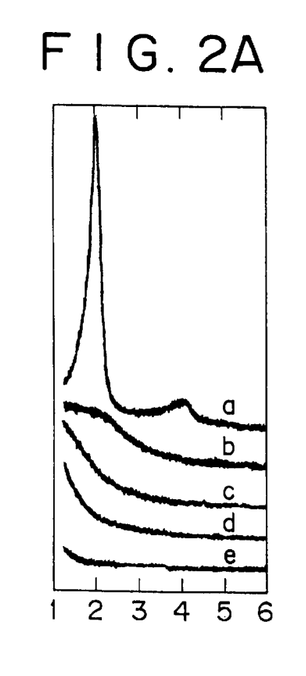
FIG. 2(A) is powder X-ray diffraction patterns, at a lower 2θ region, of porous materials obtained in Example 1 and heat-treated at various temperatures.
Figure 2B:
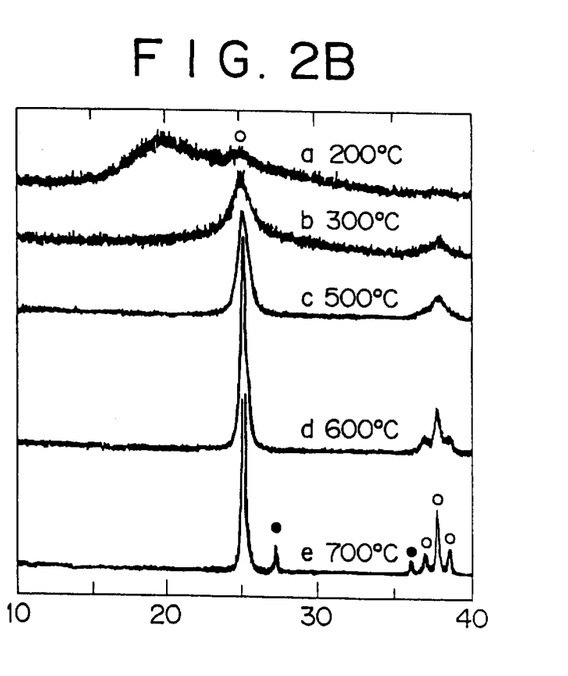
FIG. 2(B) is powder X-ray diffraction patterns, at a higher 2θ region, of porous materials obtained in Example 1 and heat-treated at various temperatures.

FIGS. 2(A) and 2(B) are powder X-ray diffraction patterns, at lower and higher 2θ regions, respectively, of porous materials obtained in Example 1 and heat-treated at various temperatures. As seen in pattern a (heat-treated at 200° C.) of FIG. 2(B), a peak (indicated by white circle) attributed to the formation of the anatase phase is present. As the heat treatment temperature increases (patterns b-e), the crystal grows. By the heat treatment at 700° C., peaks attributed to the rutile phase (indicated by white circules) are formed. From FIG. 2(A), it is recognized that peaks are broadened due to disruption of pores as an increase of the heat treatment temperature.

Figure 3A:
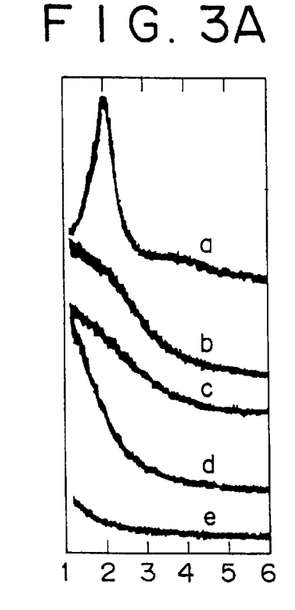
FIG. 3(A) is powder X-ray diffraction patterns, at a lower 2θ region, of porous materials obtained in Example 2 and heat-treated at various temperatures.
Figure 3B:
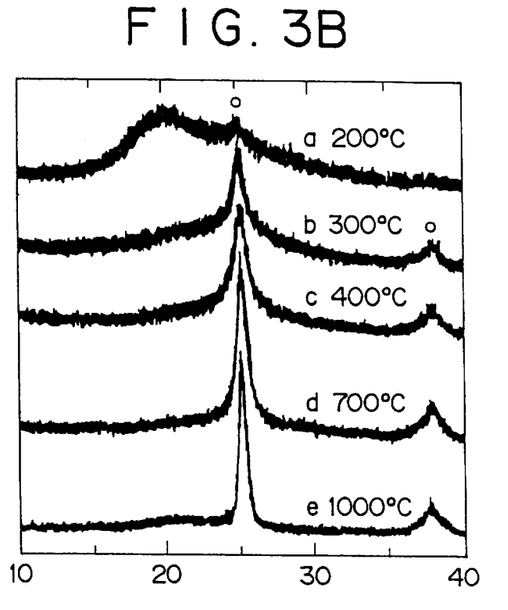
FIG. 3(B) is powder X-ray diffraction patterns, at a higher 2θ region, of porous materials obtained in Example 2 and heat-treated at various temperatures.

FIG. 3(A) and FIG. 3(B) are powder X-ray diffraction patterns, at lower and higher 2θ regions, respectively, of porous materials obtained from the silica-containing mesostructured material (Ti:Si=1:1.18) in Example 2 and heat-treated at various temperatures. Similar to FIG. 2(B), a peak (indicated by white circle) attributed to the formation of the anatase phase is present in the pattern a (treatment temperature: 200° C.). As the heat treatment temperature increases (patterns b-e), the crystal grows. However, By the heat treatment at 700° C., no peaks attributed to the rutile phase are formed even by heat treatment at 1000° C. Namely, when silica is present, the anatase phase is stable even at high temperatures. From FIG. 3(A), it is recognized that peaks are broadened due to disruption of pores as an increase of the heat treatment temperature. However, as compared with FIG. 2(A), peaks do not disappear even in the porous material obtained by heat treatment at 700° C. Regularity in pore arrangement can be retained more or less even at high temperatures when silica is present.

Figure 4:
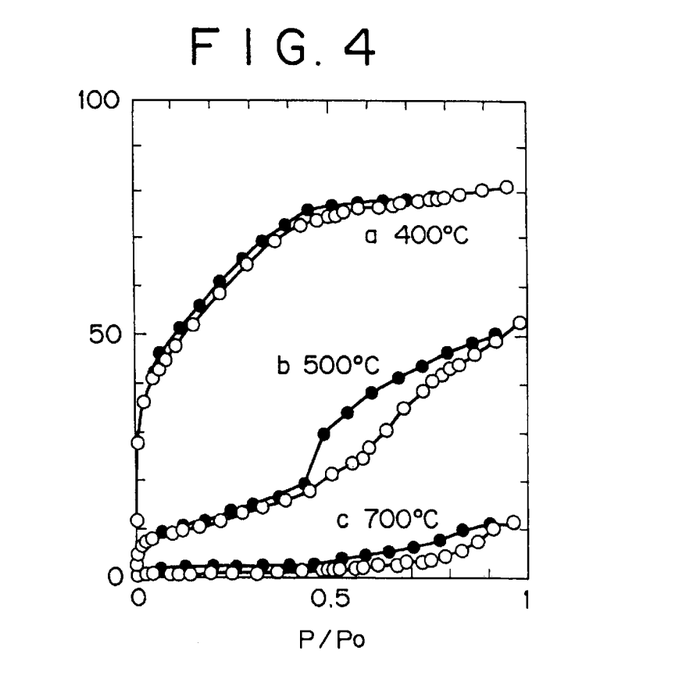
FIG. 4 is nitrogen absorption isotherms of porous materials 1-1 (Curve a), 1-2 (Curve b) and 1-3 (Curve c) obtained in Example 1 at various heat treatment temperatures.

FIG. 4 shows nitrogen absorption isotherms of porous materials 1-1 (Curve a), 1-2 (Curve b) and 1-3 (Curve c) obtained in Example 1 at heat treatment temperatures of 400° C., 500and 700° C., respectively. The t-plot reveals that as the treatment temperature increases, the microporous structure changes to mesoporous structure. The BET specific surface area is 200 $m^2$/g in the case of the porous material 1-1 (400° C.) but is decreased to 43 $m^2$/g in the case of the porous material 1-2 (500° C.) and 3 $m^2$/g in the case of the porous material 1-3 (700° C.).

Figure 5:
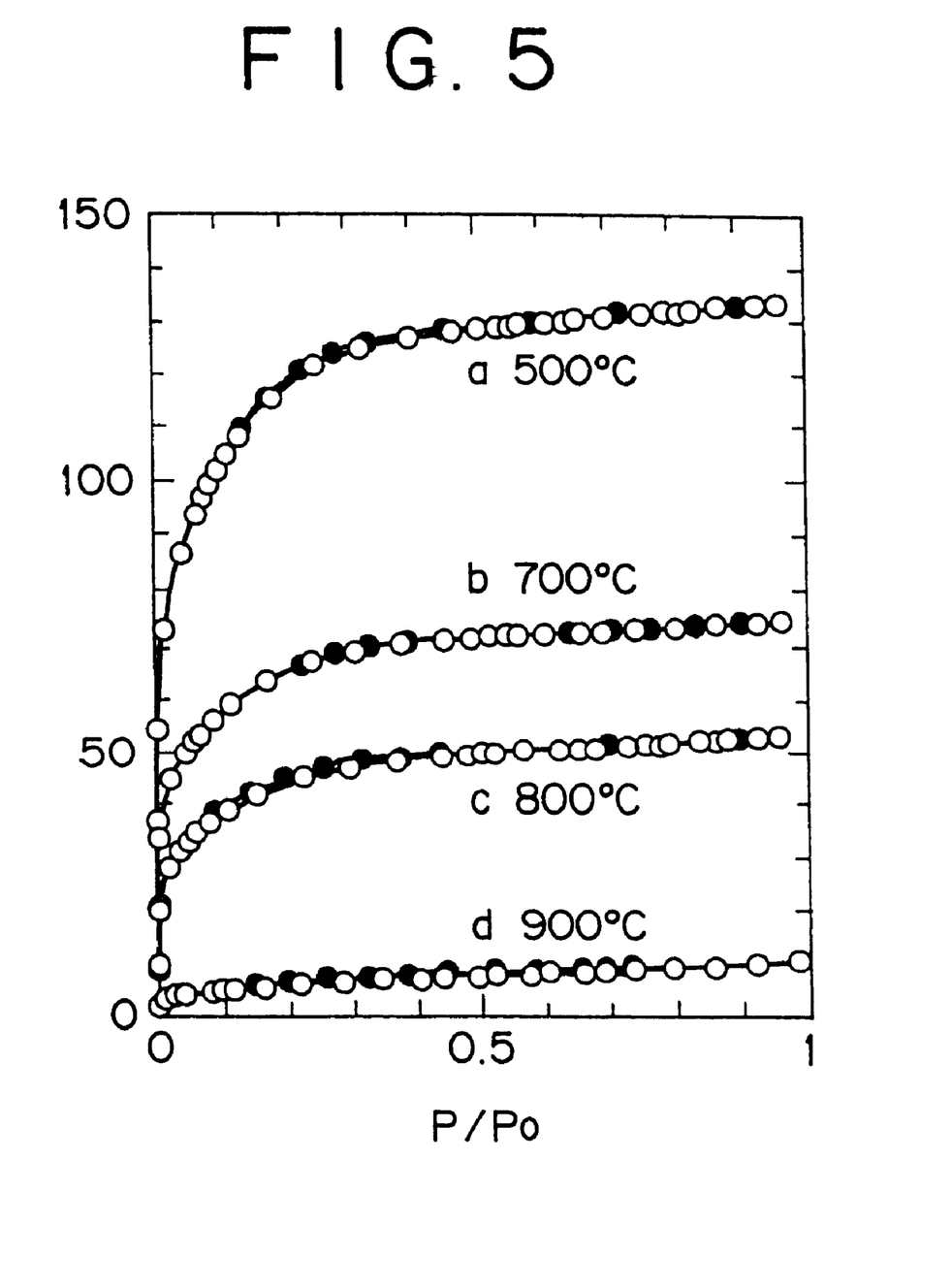
FIG. 5 is nitrogen absorption isotherms of porous materials 3-1 (Curve a), 3-2 (Curve b), 3-3 (Curve c) and 3-4 (Curve d) obtained in Example 3 at various heat treatment temperatures.

FIG. 5 is nitrogen absorption isotherms of silica-containing porous materials 3-1 (Curve a), 3-2 (Curve b), 3-3 (Curve c) and 3-4 (Curve d) obtained in Example 3 at heat treatment temperatures of 500° C., 700° C., 800° C. and 900° C., respectively. The t-plot reveals that the microporous structure is retained even when the treatment temperature increases. The BET specific surface area is as high as 247 $m^2$/g in the case of the porous material 3-2 (700° C.), indicating that the presence of silica can improve the thermal stability.

Figure 6A:
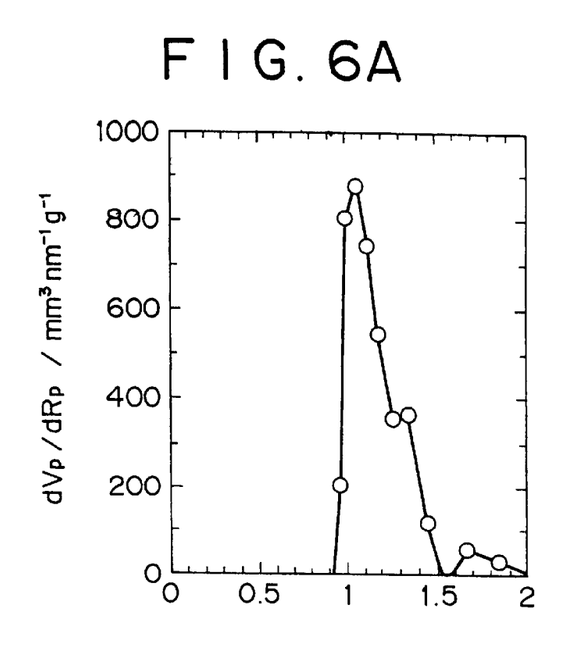
FIG. 6(A) is a pore distribution curve of porous material 1-1 obtained from the nitrogen absorption isotherm of FIG. 4.
Figure 6B:
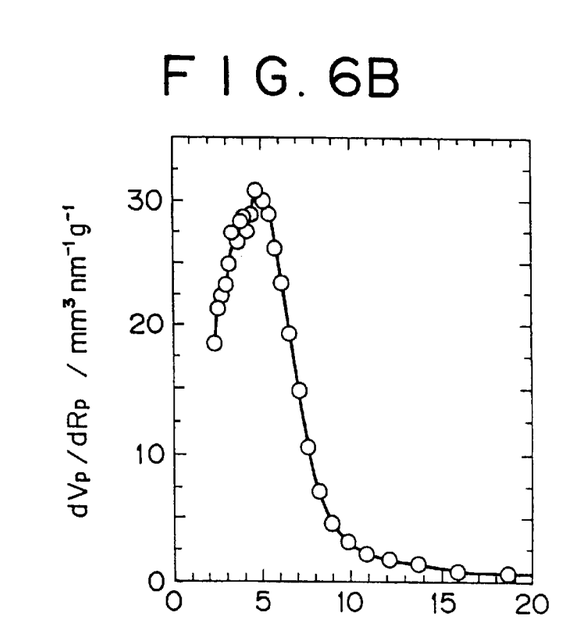
FIG. 6(B) is a pore distribution curve of porous material 1-2 obtained from the nitrogen absorption isotherm of FIG. 4.

The nitrogen adsorption and desorption isotherms shown by the pattern a (porous material 1-1 obtained at 400° C. in Example 1) and pattern b (porous material 1-2 obtained at 500° C. in Example 1) in FIG. 4 are treated according to the MP method and the BJH method, respectively, thereby to obtain pore distribution curve A as shown in FIG. 6(A) and curve B as shown in FIG. 6(B), respectively. The curves A and B have well defined peaks, indicating that the porous materials have a uniform pore diameter.

Figure 7:
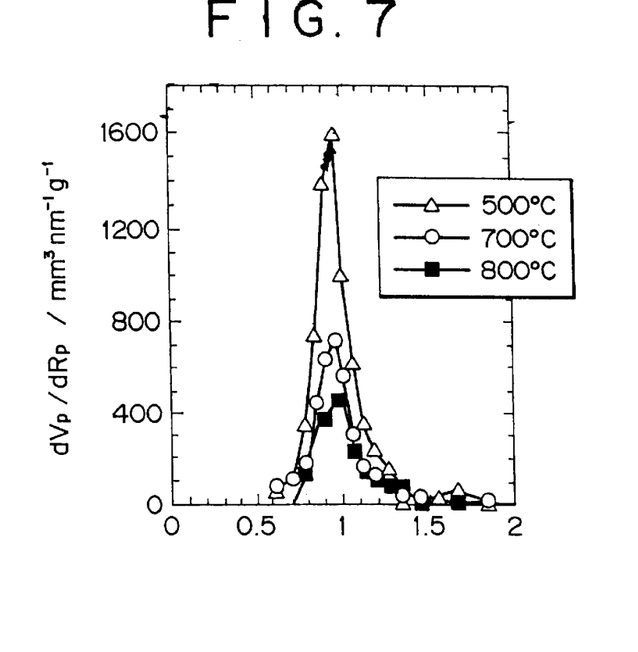
FIG. 7 is pore distribution curves of porous material 3-1, 3-2 and 3-3 obtained from the nitrogen absorption isotherm of FIG. 5.

FIG. 7 shows pore distribution curves of porous material 3-1 obtained at 500° C. (pattern plotted by white triangle), 3-2 obtained at 700° C. (pattern plotted by white circle) and 3-3 obtained at 800° C. (pattern plotted by black square) in Example 3. The pore distribution curves are obtained from the nitrogen adsorption and desorption isotherms shown in FIG. 5 by applying the MP method. The curves have well defined peaks, indicating that the porous materials have a uniform pore diameter.

Figure 8:
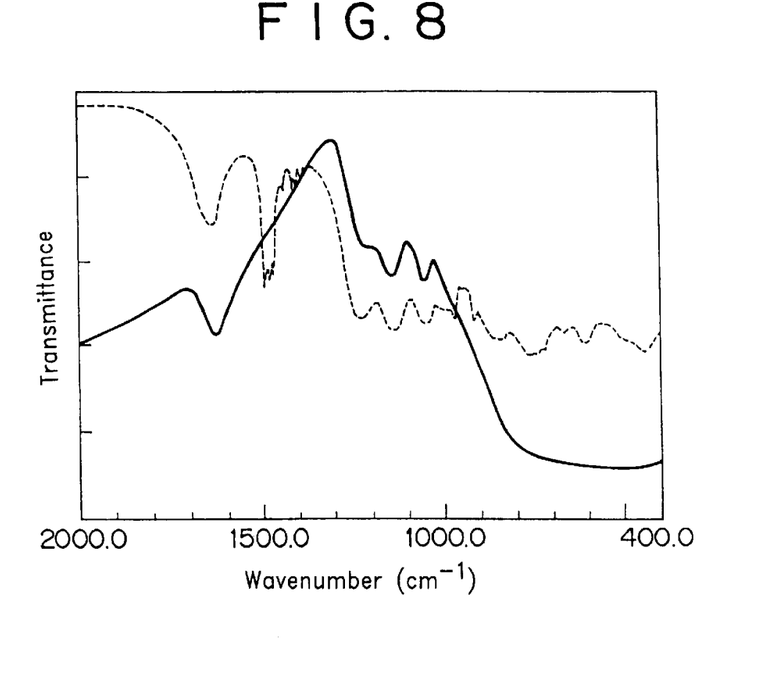
FIG. 8 is infrared absorption spectra of the mesostructured material (dotted line) and the porous material 1-2 (solid line) obtained in Example 1.

FIG. 8 is infrared absorption spectra of the mesostructured material (dotted line) obtained in Example 1 and the porous material 1-2 (solid line) obtained by heat treating the mesostructured material at 500° C. Three absorption peaks attributed to $SO_4$ ion are seen at 1000–1300 $cm^{-1}$ in both spectra, indicating that $SO_4$ ions are present on pore walls of the porous material. Absorption peaks attributed to water and hexadecyltrimethylammonium are also observed.

Figure 9:
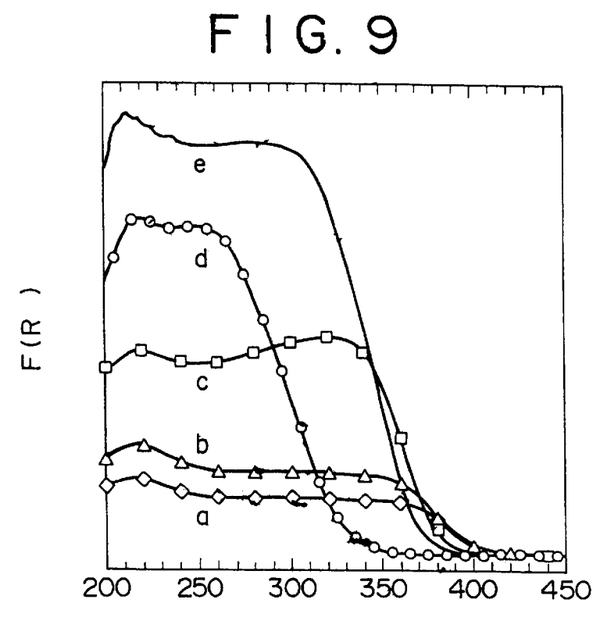
FIG. 9 is ultraviolet and visible light absorption spectra of commercially available anatase (curve e) and porous materials 2-1 (curve a), 2-2 (curve b), 2-4 (curve c) and 2-5 (curve d) obtained in Example 2.

FIG. 9 is ultraviolet and visible light absorption spectra of commercially available anatase (spectrum e) and porous materials 2-1 (spectrum a; Ti:Si=1:0.00), 2–2 (spectrum b; Ti:Si=1:0.29), 2–4 (spectrum c; Ti:Si=1:1.18) and 2–5 (spectrum d; Ti:Si=1:2.95) obtained in Example 2 and various Si contents. When silica is present in a large amount (spectrum d), the absorption spectrum greatly differs from that of the anatase (spectrum e), because of an infulence of Ti—O—Si. When no or only a small amount of silica is present (spectra a, b and c), the shape of the absorption spectrum is similar to that of anatase, although the absorption intensity is weak. The absorption spectra a–d correspond to the X-ray diffraction patterns a–d, respectively. The porous material 2-5 giving the spectrum d shows no peak attributed to anatase in the X-ray diffraction pattern.

Figure 10:
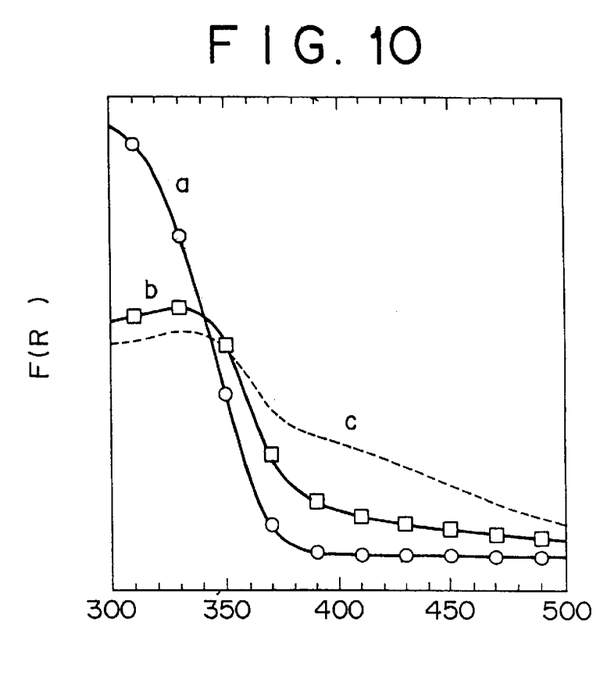
FIG. 10 is ultraviolet and visible light absorption spectra of commercially available anatase (curve a) and porous materials 4-1 (curve c), 5-1 (curve b).

FIG. 10 is ultraviolet and visible light absorption spectra of commercially available anatase (curve a) and porous materials 4-1 containing Cu (curve c) and 5-1 containing Cr (curve b). The serrated pattern in the spectrum b in a wavelength of above 400 nm coincides with that of chromium oxide ($Cr_2O_3$), indicating that chromium is present as impurities. The spectrum c for the Cu-containing porous material shows an absorption for visible light with a wavelength of above 400 nm. This suggests that Cu is substituted for part of Si and Ti of the crystals.

The following examples will further illustrate the present invention.

EXAMPLE 1

Titanium oxysulfate $TiOSO_4 \cdot xH_2SO_4 \cdot xH_2O$ was dissolved in hydrochloric acid, with which a solution of CTABr (hexadodecyltrimethylammonium bromide) in hydrochloric acid was reacted with stirring at room temperature for 12 hours. The molar ratio of the reactants $Ti:CTABr:HCl:H_2O$ was 1:1.67:1.58:1463. The reaction product was isolated by centrifuge and filtration and then dried at 50°C. for 2 days to obtain a mesostructured material. The X-ray diffraction pattern of the mesostructured material is shown in FIG. 1 (pattern a). The mesostructured material was subjected to a heat treatment at temperatures shown in Table 1 to obtain porous materials 1-1, 1-2 and 1-3 in which crystalline titanium oxide constituted walls of the pores. The pore characteristics of the porous materials 1-1, 1-2 and 1-3 are also summarized in Table 1. In the pore walls, $SO_4$ ions were found to be present.

TABLE 1

| Porous Material | Temperature of Heat Treatment (° C.) | Specific Surface Area ($m^2/g$) | Pore Volume (ml/g) | Pore Diameter (nm) |
|---|---|---|---|---|
| 1-1 | 400 | 200 | 0.12 | 1.2 |
| 1-2 | 500 | 43 | 0.06 | 4.8 |
| 1-3 | 700 | 3 | — | — |

EXAMPLE 2

Titanium oxysulfate $TiOSO_4 \cdot xH_2SO_4 \cdot xH_2O$ was dissolved in hydrochloric acid, with which TEOS (tetraethylorthosilicate) was mixed with stirring for 20 minutes. This was then reacted with a solution of CTABr (hexadodecyltrimethylammonium bromide) in hydrochloric acid at room temperature with stirring for 12 hours. The reaction product was isolated by centrifuge and filtration and then dried at 50° C. for 2 days to obtain a mesostructured material. The X-ray diffraction pattern of the mesostructured material is shown in FIG. 1 (pattern b).

The mesostructured material was subjected to a heat treatment at 700° C. to obtain a porous material in which crystalline titanium oxide and silica constituted walls of the pores. In the pore walls, $SO_4$ ions were found to be present. The above procedure was repeated in the same manner as described using various amounts of TEOS, i.e. with various molar ratios of Ti:Si as shown in Table 2. However, the molar ratio of the reactants $Ti:CTABr:HCl:H_2O$ was the same as that in Example 1, i.e. 1:1.67:1.58:1463. The pore characteristics of the porous materials 2-1, 2-2, 2-3, 2-4 and 2-5 are shown in Table 2.

TABLE 2

| Porous Material | Molar Ratio of Ti:Si | Specific Surface Area ($m^2/g$) | Pore Volume (ml/g) | Pore Diameter (nm) |
|---|---|---|---|---|
| 2-1 | 1:0.00 | 3 | — | — |
| 2-2 | 1:0.29 | 59 | 0.09 | 6.1 |
| 2-3 | 1:0.65 | 168 | 0.10 | 1.1 |
| 2-4 | 1:1.18 | 247 | 0.11 | 0.94 |
| 2-5 | 1:2.95 | 711 | 0.38 | 0.92 |

EXAMPLE 3

The mesostructured material obtained in Example 2 using a molar ratio of Ti:Si of 1:1.18 and giving the porous material 2-4 was subjected to a heat treatment at various temperatures shown in Table 3 to give porous material 3-1, 3-2, 3-3 and 3-4 whose pore characteristics are also shown in Table 3.

TABLE 3

| Porous Material | Temperature of Heat Treatment (° C.) | Molar Ratio of Ti:Si | Specific Surface Area ($m^2/g$) | Pore Volume (ml/g) | Pore Diameter (nm) |
|---|---|---|---|---|---|
| 3-1 | 500 | 1:1.18 | 489 | 0.20 | 0.92 |
| 3-2 | 700 | 1:1.18 | 247 | 0.11 | 0.92 |
| 3-3 | 800 | 1:1.18 | 161 | 0.08 | 0.92 |
| 3-4 | 900 | 1:1.18 | 20 | 0.01 | — |

EXAMPLE 4

Titanium oxysulfate $TiOSO_4 \cdot xH_2SO_4 \cdot xH_2O$ was dissolved in hydrochloric acid, with which $CuSO_4 \cdot 6H_2O$ was mixed to obtain a transparent solution. This was then mixed with TEOS (tetraethylorthosilicate) with stirring for 20 minutes. The resulting mixture was then reacted with a solution of CTABr (hexadodecyltrimethylammonium bromide) in hydrochloric acid at room temperature with stirring for 12 hours. The molar ratio of the reactants $Ti:CTABr:HCl:H_2O:TEOS:Cu$ was 1:1.68:1.58:1464:1.18:0.55. The reaction product was isolated by centrifuge and filtration and then dried at 50° C. for 2 days to obtain a mesostructured material. This was subjected to a heat treatment at 700° C. to obtain a porous material in which Ti, Si and Cu are present in the skeletal structure of the pore walls. The pore characteristics of the porous material 4-1 are shown in Table 4.

TABLE 4

| Porous Material | Molar Ratio of Ti:Si:Cu | Specific Surface Area ($m^2/g$) | Pore Volume (ml/g) | Pore Diameter (nm) |
|---|---|---|---|---|
| 4-1 | 1:1.18:0.55 | 232 | 0.10 | 0.95 |

EXAMPLE 5

Example 4 was repeated in the same manner as described except that $CuSO_4 \cdot 6H_2O$ was replaced by hydrates of $CrCl_3$, $VSO_4$, $NiSO_4$, $CoSO_4$ and $FeSO_4$ to obtain porous materials 5-1, 5-2, 5-3, 5-4 and 5-5 in which Ti, Si and M (M=Cr, V, Ni, Co and Fe) are present in the skeletal structure of the pore walls. The molar ratio of the reactants $Ti:CTABr:HCl:H_2O$ was the same as that in Example 4, i.e. 1:1.68:1.58:1464. However, the molar ratio of Ti:Si:M was as shown in Table 5. The pore characteristics of the porous material are shown in Table 5. The porous materials 5-1 through 5-5 were found to have a pore diameter in the range of 0.95–0.11 nm.

TABLE 5

| Porous Material | Metal M | Molar Ratio of Ti:Si:M | Specific Surface Area ($m^2/g$) | Pore Volume (ml/g) |
|---|---|---|---|---|
| 5-1 | Cr | 1:1.18:0.51 | 256 | 0.12 |
| 5-2 | V | 1:1.18:0.30 | 226 | 0.12 |
| 5-3 | Ni | 1:1.18:0.16 | 268 | 0.13 |
| 5-4 | Co | 1:1.18:0.15 | 247 | 0.12 |
| 5-5 | Fe | 1:1.18:0.08 | 247 | 0.11 |

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

The teachings of Japanese patent Application No. H11-325722, filed Nov. 16, 1999, inclusive of the specification, claims and drawings, are hereby incorporated by reference herein.

What is claimed is:

1. An inorganic porous material, having pores of uniform pore diameter and defined by pore walls comprising anatase form crystalline titanium oxide and silica, said porous material having a pore diameter of 0.9–7 nm, a pore volume of 0.06–0.25 ml/g and a specific surface area of 40–500 $m^2/g$, wherein said porous material has an x-ray diffraction pattern showing a peak for anatase, but no peak attributable to a rutile phase.

2. An inorganic porous material as claimed in claim 1, wherein the pore walls further comprise a transition metal substituted for a portion of the titanium of said titanium oxide and/or a portion of the silicon of said silica.

3. An inorganic porous material as claimed in claim 1, produced by a method comprising heating an organic mesostructured material containing titanium and having a hexagonal crystal phase at a temperature and for a peroid of time sufficient to form a porous material having a multiplicity of pores defined by pore walls containing crystalline titanium oxide.

4. An inorganic porous material as claimed in claim 3, wherein said mesostructured material is obtained by reacting a liquid containing titanium oxysulfate with a liquid containing a surfactant to form precipitates, followed by isolation and drying of the precipitates.

5. An inorganic porous material according to claim 4 wherein said liquid containing titanium oxysulfate additionally contains a silicon alkoxide.

* * * * *